United States Patent [19]

Muchow et al.

[11] Patent Number: 4,471,810

[45] Date of Patent: Sep. 18, 1984

[54] VALVE APPARATUS

[75] Inventors: John D. Muchow, Carson; Harry R. Cove, Huntington Beach, both of Calif.

[73] Assignee: Valve Concepts International, Carson, Calif.

[21] Appl. No.: 365,739

[22] Filed: Apr. 5, 1982

Related U.S. Application Data

[63] Continuation of Ser. No. 212,822, Dec. 4, 1980, abandoned.

[51] Int. Cl.³ .............................................. F17D 1/08
[52] U.S. Cl. ............................. 137/625.37; 251/191; 251/282
[58] Field of Search ................... 137/625.38, 625.37; 251/282, 170, 191, 324, 325, 333

[56] References Cited

U.S. PATENT DOCUMENTS

| | | | |
|---|---|---|---|
| 878,183 | 2/1908 | Brauner | 137/625.38 |
| 2,092,819 | 9/1937 | Tennant | 251/282 |
| 4,041,982 | 8/1977 | Lindner | 137/625.37 |
| 4,132,386 | 1/1972 | Lee | 251/191 |
| 4,244,388 | 1/1981 | Feiss | 137/625.38 |

FOREIGN PATENT DOCUMENTS

| | | | |
|---|---|---|---|
| 477657 | 10/1951 | Canada | 137/625.38 |
| 197065 | 5/1923 | United Kingdom | 137/625.38 |

Primary Examiner—A. Michael Chambers
Assistant Examiner—Sheri Novack
Attorney, Agent, or Firm—Dodge & Bush

[57] ABSTRACT

A new and improved valve apparatus having an operating mechanism sealed in such a manner that the fluid pressure urging thereon produces offsetting or balancing forces to enhance ease of valve operation. To accomplish the force balancing, the flow closure means is continuously sealed to the valve housing and seat to produce the desired pressure responsive surfaces. By balancing the pressure forces, movement of the valve closure element between the open and closed positions with a minimum of operating force is accomplished. In addition the operating mechanism tubular flow closure element and valve seat having a plurality of opposed radially disposed flow opening are arranged so that the controlled flow through the openings into the seat impinges on itself to prevent flow cutting or erosion of the valve seat. When the flow closure element moves to the closed position, it activates a protected second seal on the seat to block flow throuh the flow openings.

9 Claims, 2 Drawing Figures

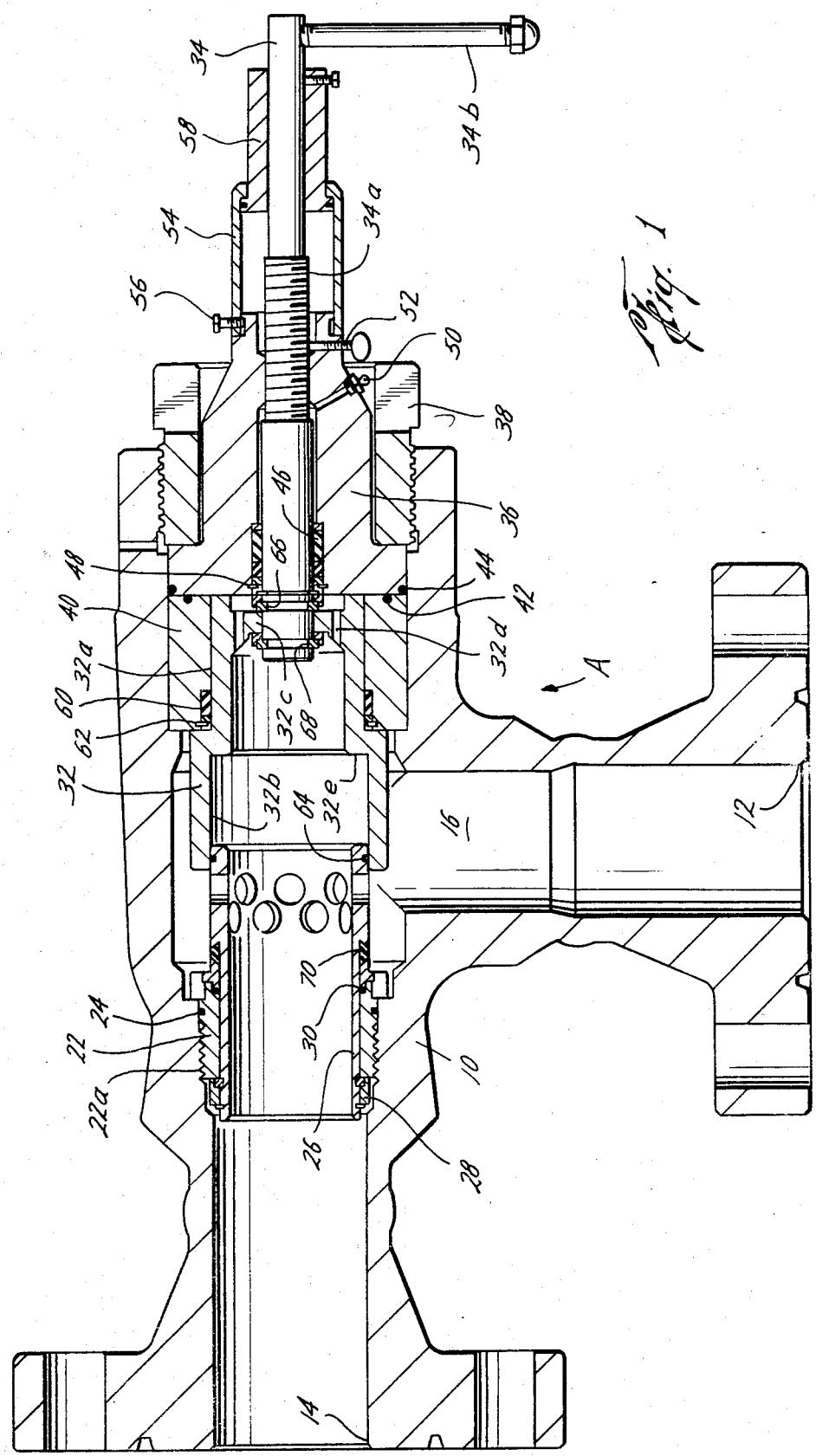

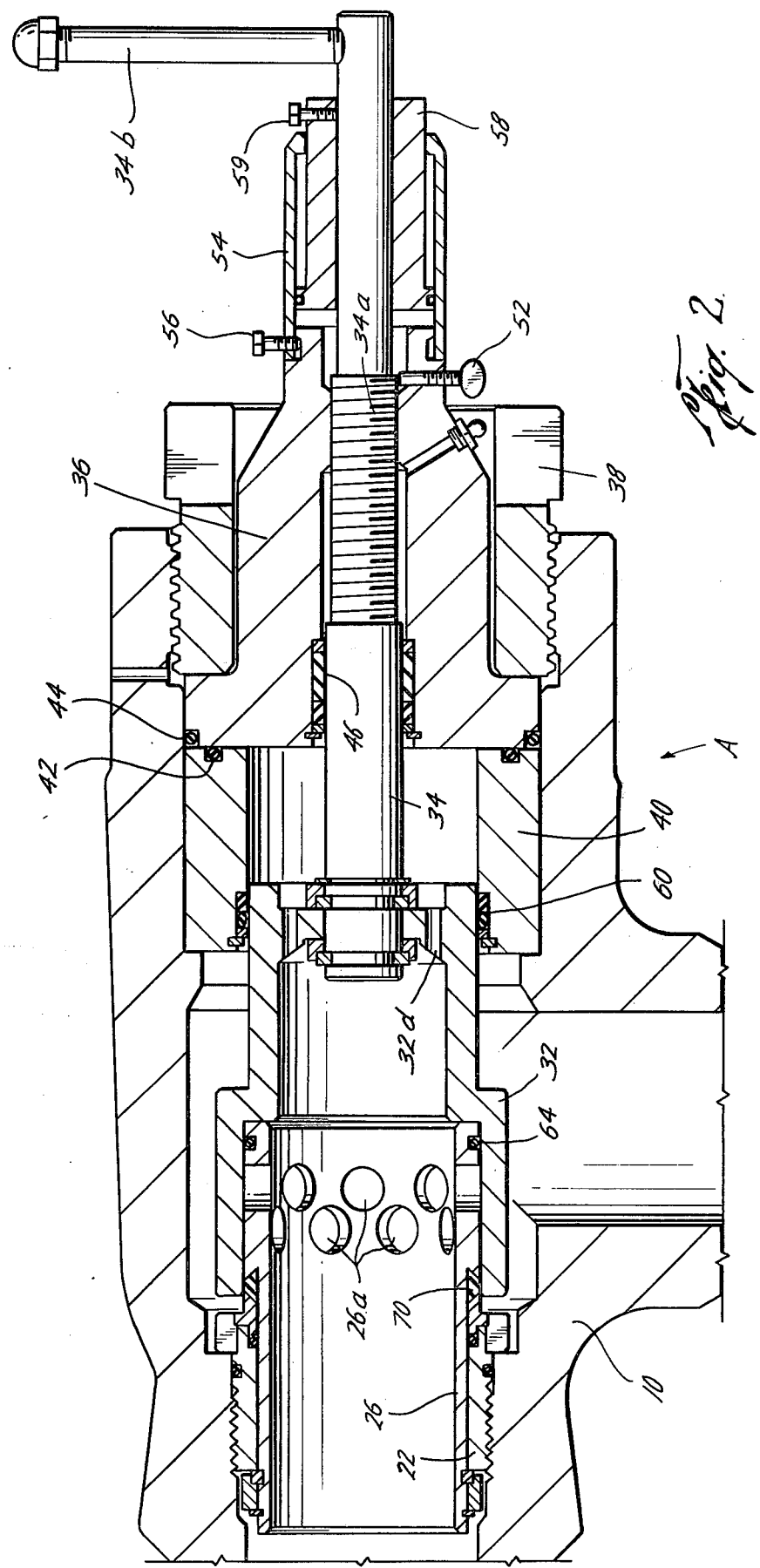

VALVE APPARATUS

This application is a continuation of application Ser. No. 212,822 filed Dec. 4, 1980 now abandoned.

TECHNICAL FIELD

The present invention relates to valves for controlling flow of fluids and more particularly to valves in which the effect of the fluid pressure is balanced or offset on the valve operating mechanism to provide for ease of operation.

BACKGROUND ART

Valves for controlling large volumes of fluid at high operating pressures are known. Such valves have relied on heavy duty design of generous thicknesses or proportions to withstand or contain the large forces resulting from the high operating pressures. Such design resulted in valves that were both expensive to build and bulky for a particular pipe size. In addition, they were extremely difficult to operate and often required expensive heavy duty actuators for reliable operation.

To avoid some of the problems in operating these valves, the moving parts or operating mechanism exposed to the contained fluid, usually the stem and flow closure elements, were sealed or made pressure responsive in such a manner that the resulting forces were substantially balanced or offset. This enabled valve operation with smaller forces or actuators, but the valve mechanisms were complex having a tendency to malfunction and as a result were more expensive to manufacture. Such a valve, commonly referred to as a choke, is manufactured by the Thornhill-Graver Division of Galveston-Houston Company. In this valve, a replaceable seat ring through which the flow is directed is sealed to the valve housing and the tubular flow closure element is spaced from the seat to enable flow and is reciprocated into sealing engagement with the seat for closing off flow. A tubular guide member provides a movement guide for the reciprocating flow closure element which is also sealed with the guide member to preclude the greater upstream pressure from providing an unbalanced pressure urging on the flow closure element. The flow closure element is also formed with a fluid bypass port for enabling the downstream fluid pressure to provide substantially offset urging on the flow closure element to balance or eliminate any operation or movement resistive force. With this arrangement, the only significant unbalanced force on the operating mechanism is that produced by the sealed area of the valve stem. Since this is a relatively small pressure responsive area the resultant unbalanced force is small and easily overcome by standard valve actuators or operating mechanisms.

To minimize the problem of abrasive matter contained with the fluid eroding or cutting out the valve seat, the valve is fabricated with a hardened seat that is easily replaced. The sealing surfaces of the replaceable seat are not protected from the flow and seat damage with resultant valve leakage occurs rapidly requiring frequent repair and replacement. While this arrangement provided for ease of repair it did not provide a satisfactory length of service between repairs.

SUMMARY OF THE INVENTION

The present invention provides a new and improved valve apparatus for controlling flow of fluid in which the operating mechanism is substantially pressure balanced to enhance ease of operation of the valve apparatus. The fluid containing housing of the valve is provided with a flow passage having a right angle turn between the inlet and outlet openings with a replaceable seat sleeve sealingly secured with the housing adjacent the outlet. A tubular flow closure member reciprocated by a rotatable stem cooperates with the seat sleeve for controlling flow through the flow passage. The tubular flow closure member is continuously sealed with the housing and the seat sleeve to form oppositely facing fluid pressure responsive areas in order that the pressure created forces will be substantially balanced for ease of operation of the valve.

The seat sleeve also carries a second seal actuated by engagement with the tubular member in the closed position to block flow through a plurality of radially opposed flow openings disposed between the two seals. Flow through the flow openings mutually impinge when the tubular member is in the open position spaced from the second seal for enabling flow. The impinged flow protects the seat sleeve from flow erosion or other flow damage while the location of the second seal on the sleeve also protects it from flow erosion.

BRIEF DESCRIPTION OF THE DRAWINGS

FIG. 1 is a side view, in section, of the valve apparatus of the present invention in the open or flow enabling position; and FIG. 2 is a view similar to FIG. 1 of the valve apparatus operated to the closed position.

DESCRIPTION OF THE PREFERRED EMBODIMENT

The valve apparatus, generally designated A in the FIGS., is used to contain and control flow of fluid in the usual manner. The valve apparatus includes a generally T-shaped valve housing 10 having an inlet opening 12 and an outlet opening 14 for connection with the flow conduit of the fluid in the usual manner. The inlet 12 and outlet 14 are illustrated in FIG. 1 with flange end connections for securing in the flow conduit (not illustrated) but it is understood that different types of end connections may be provided for the inlet 12 and outlet 14 of the valve housing 10 without departing from the scope of the present invention.

Formed by the valve housing 10 is a fluid flow passage 16 for communicating the inlet 12 and the outlet 14. The flow passage 16 forms a right angle turn between the inlet 12 and the outlet 14 which are disposed at right angles to each other. Preferably, the flow passage 16 is formed of substantially the same diameter as the flow conduit to provide a full opening valve apparatus A to minimize or reduce any flow restriction or flow resistance by the housing 10.

Disposed in the flow passage 16 adjacent the flow outlet 14 is a seat sleeve means or assembly 20 providing a flow shut off seat means for the valve apparatus A. The seal sleeve assembly 20 includes a replaceable bushing 22 which threadedly engages the valve housing 10 at 22a for securing the seat sleeve means 20 with the valve housing 10. The bushing 22 also carries an O-ring 24 for blocking leakage of fluid between the bushing 22 and the valve housing 10 and effecting a seal therebetween.

Concentrically disposed within the bushing 22 is the valve seat sleeve 26 which is provided with a limited range of longitudinal movement relative to the bushing 22 for a purpose to be described more fully hereinafter. Mounted with the sleeve 26 below the bushing 22 is a retainer 28 for securing the sleeve 26 with the bushing 22 in order that the entire seat sleeve assembly 20 may be installed or removed from the valve housing 10 as a unit. The bushing 22 carries an O-ring 30 for sealing between the bushing 22 and the sleeve 26 to block leakage of fluid therebetween.

Disposed in the flow passage 16 and in operable engagement with the seat 26 is a tubular flow closure element 32. The tubular flow closure element is movable to and from the open position illustrated in FIG. 1 for enabling flow of fluid through the valve apparatus A and the closed position illustrated in FIG. 2 where it cooperates with the seat sleeve assembly 20 for blocking flow of fluid through the valve apparatus A. Operably connected with the tubular flow closure element 32 is a valve operating stem 34 having a helical thread 34a which interengages with threads formed on the valve housing bonnet 36. Rotation of the stem 34 will affect the desired reciprocating movement of the operably connected tubular element 32 to and from the open and closed position in the usual manner. The valve housing bonnet 36 forming the threads engaging the stem 34 is secured to the valve housing 10 using threaded retainer bushings 38 and housing spacer seal ring 40. The seal ring 40 carries an O-ring 42 for sealing with the bonnet 36 which also carries an O-ring 44 for sealing with the housing 10 to block leakage of fluid therebetween in the usual manner. The bonnet 36 also carries annular packing 46 for effecting a fluid seal with the rotatable stem 34 that is held by the snap retainer 48 in the usual manner. A grease fitting 50 is provided in the bonnet 36 above packing 46 to enable lubrication of the rotating stem 34 for ease of operation. A lock screw 52 is also provided to prevent inadvertent rotation of the stem 34 when it is desired to lock the stem 34 and element 32 in a fixed position relative to the housing 10.

Secured with the bonnet 36 is a stem thread protector jacket 54 that is held by set screw 56. The thread protector jacket 54 telescopingly mounts an upper guide collar 58 for the rising stem 34 immediately below the operating handle 34b. The guide collar 58 is secured to the stem 34 by set screw 59 for rotation with the stem 34 relative to the jacket 54.

The sealing ring 40 carries an annular seal element 60 which is secured thereto by retainer 62 for effecting a continuous seal with an outer surface 32a of the tubular element 32. An O-ring 64 carried by the seat sleeve 26 also affects a first continuous seal with the inner surface 32b of the tubular element 32. The seal of the O-ring 64 and the seal element 60 with the tubular element 32 are maintained continuously as the tubular element 32 is moved to and from the open and closed position by rotation of the stem 34. To enable the relative rotation of the stem 34 to the tubular member 32 and provide the operable connection therebetween a pair of split retainer rings 66 and 68 are carried in annular grooves formed in the stem 34 on opposite sides of inwardly projecting lugs 32c of the tubular element 32. The lugs 32c are provided with opening 32d to enable communication of fluid pressure between the retainers 66 and 68 for a purpose to be more fully described hereinafter.

The tubular element 32 is provided with a downwardly facing shoulder 32e which engages the sleeve 26 for moving the sleeve 26 downwardly relative to the fixed bushing 22 to radially expand a second seal 70 carried by seat 26 for sealing with the tubular element 32 when it moves to the closed position (FIG. 2). When the tubular element 32 reciprocates upwardly from the sleeve 26 the seal by the annular seal member 70 is interrupted and when the tubular element 32 is moved sufficiently flow of fluid will pass inwardly through a plurality of radial oppositely disposed openings 26a formed in the sleeve 26. The inwardly directed flow through the openings 26a will impinge upon the flow through the oppositely disposed opening to avoid flow cutting or flow erosion of the sleeve 26 to provide a long operating life for the valve apparatus A.

The seal of the O-ring 64 and the packing 60 with the tubular element 32 are formed on the same diameter even though they are on the inner surface 32b and outer surface 32a. Thus upstream fluid pressure externally of the seat 26 urging on the tubular element 32 will be provided with equal but oppositely facing pressure responsive surfaces on the tubular member 32 and the net force produced by such pressure on the tubular member 32 will be substantially offset or balanced. The fluid pressure within the tubular member 26 downstream of the flow openings 26a will also be offset on the tubular element 32. The downstream pressure will urge upwardly on the shoulder 32e but will be communicated through the ports 32b where it will urge downwardly on the member 32 above the annular seal 60. Thus the downstream pressure as well as the upstream pressure on the tubular member 32 will be offset, permitting an ease of operating movement by rotation of the stem 34. When the tubular element 32 is moved to the closed position and effecting operation of the second annular seal 70 the upstream pressure at the inlet 12 will also provide an equal and offset urging on the sleeve 32 as the diameter of that seal is also the same diameter as that of the O-ring 64 and the annular seal 60. Thus the effect of the fluid pressure on the tubular element 32 is substantially offset during the entire operating range of reciprocation of the tubular element 32.

Use and Operation of the Present Invention

In the use and operation of the present invention the valve is assembled in the manner indicated. The seat sleeve assembly 20 is initially installed in the valve housing 10. The sealing ring 40 and tubular element 32 are then assembled with the stem 34 and bonnet 36, all of which are installed as a unit. The bonnet retainer 38 is then installed to secure that entire assembly within the valve housing 10. Such an arrangement provides an ease of assembly and ready access for maintenance purposes.

When the valve is in the closed position illustrated in FIG. 2, the sleeve 26 is depressed relative to the bushing 22 for radially expanding the seal element 70 to effect the second seal between the sleeve 26 and the tubular element 32. The O-ring 64 and the annular packing 60 are also providing the continuous seal between the tubular element 32 and the sleeve 26 and sealing ring 40 of the housing 10. In such condition, the seal ring 70 blocks flow of fluid from the inlet 12 to the plurality of flow ports 26a or blocking flow of fluid through the flow passage 16.

To open the valve apparatus A and enable flow of fluid through the flow passage 16, the stem 34 is rotated to reciprocate the tubular element 32 upwardly from the sleeve 26. This movement spaces the tubular element 32 from the lower annular seal 70 for enabling the controlled amount of flow inwardly through the opening 26a into the interior of the sleeve 26. As the openings 26a are disposed raidally opposite each other the flow that occurs impinges upon itself for preventing erosion or flow cutting of the sleeve 26. The stem 34 is rotated sufficiently to expose the desired flow area of the plurality of flow openings 26a to achieve the desired flow rate and provide precise metering of the flow through the valve apparatus A.

The seals effected by the annular packing 60 and the O-ring 64 continuously seal between the tubular element 32 in the sleeve 26 to provide substantially offset urging of the fluid pressure on the tubular element 32 for ease of operation which need not be overcome when rotating the stem 34 to reciprocate the tubular element 32.

The foregoing disclosure and description of the invention are illustrative and explanatory thereof, and various changes in the size, shape and materials, as well as in the illustrated construction, may be made without departing from the spirit of the invention.

We claim:

1. A new and improved valve apparatus for controlling the rate of flow of fluids through the valve apparatus, including:

a valve housing adapted for connection in a flowline to form a portion thereof for containing fluid under pressure in the flowline, said housing having a flow inlet and a flow outlet communicating with the flowline when connected therein, said inlet and said outlet disposed at substantially right angles to each other;

a flow passage formed in said housing for communicating said inlet and said outlet to enable flow of fluid therebetween;

seat means disposed in said flow passage adjacent said outlet and sealed with said housing for directing flow of fluid in said flow passage through said seat means;

closure means disposed in said flow passage for movement to and from an open position enabling a variable selected rate of flow through said flow passage and a closed position sealing with said seat means for blocking flow of fluid through said flow passage;

stem means movably mounted with said housing and operably connected with closure means for moving said closure means to and from the open and closed positions and thereby controlling the rate of flow by such movement of said closure means, said stem means sealed to said valve housing to block leakage of fluid therebetween, said stem means having a longitudinal axis aligned with a longitudinal axis formed by said outlet and disposed perpendicular to a longitudinal axis formed by said inlet; and said closure means including a tubular flow closure member having a cylindrical inner and cylindrical outer surface, said cylindrical inner surface continuously forming a first seal with said seat means and said outer cylindrical outer surface continuously forming a seal with said seal housing, said continuous seal of said tubular closure member with said housing at substantially the same sealing diameter as the continuous seal with said seat means to balance the urging of the fluid pressure upstream of said seat means on said closure means to enable positioning movement of said closure means substantially independent of the fluid pressure upstream of said seat means when controlling the rate of flow.

2. The valve apparatus as set forth in claim 1, wherein:

said seat mean having a sleeve forming a second seal with said inner surface of said movable tubular member when said tubular member is reciprocated to the closed position, said second seal between said sleeve and said tubular member located a preselected longitudinal spaced location on said sleeve from the continuous seal with the tubular member and having substantially the same sealing diameter as the continuous seal of said tubular member and said seat.

3. The valve apparatus as set forth in claim 2, wherein:

said seat means sleeve having an outer surface for sealing with said cylindrical inner surface of said tubular member to provide said continuous first seal and said second seal at longitudinally spaced apart locations, said sleeve having a plurality of radial flow openings formed therethrough between said first and second sealing locations for enabling inward flow therethrough when said tubular member is moved from the closed position.

4. The valve apparatus as set forth in claim 3, wherein:

said plurality of flow openings disposed in opposed radial relationship to enable inwardly flow into said sleeve through said flow opening to impinge upon like flow to avoid flow erosion or flow cutting of said sealing areas of said sleeve.

5. The valve apparatus as set forth in claim 3, wherein:

said tubular member forming an annular shoulder engageable with said sleeve when said tubular member moves to the closed position; and said second seal radially expanded into said sealing engagement with said inner surface of said tubular member when said annular shoulder engages said sleeve.

6. A new and improved valve apparatus for controlling flow of fluids, including:

a valve housing adapted for connection in a flowline to form a portion thereof for containing fluid under pressure in the flowline, said housing having a flow inlet and flow outlet communicating with the flowline when connected therein, said inlet and said outlet disposed at right angles to each other;

a flow passage formed in said housing for communicating said inlet and said outlet to enable flow of fluid therebetween;

a seat sleeve means disposed in said flow passage adjacent said outlet and sealed with said housing for directing flow of fluid in said flow passage through said seat sleeve means;

a tubular flow closure means disposed in said flow passage for reciprocating movement to and from an open positon enabling a selected rate of flow through said flow passage and a closed position sealing with said seat sleeve means for blocking flow of fluid through said flow passage;

a stem means movably mounted with said housing and operably connected with tubular flow closure means for moving said closure means to and from the open and closed positions in response to rotation of said stem means, said stem means sealed to said valve housing to block leakage of fluid therebetween, said stem means having a longitudinal axis aligned with said outlet and disposed perpendicular to said inlet; and said tubular flow closure means having an inner surface and an outer surface, said inner surface continuously sealing with said seat sleeve means at a first location and having said outer surface continuously sealing with said valve housing at a location longitudinally spaced from said first sealing location for balancing the urging of the fluid pressure upstream of said seat means on said tubular flow closure means said tubular flow closure means having a port to equalize the urging of flow pressure downstream of said seat on said tubular flow closure means for enabling reciprocation of said tubular flow closure means by said stem means substantially independent of the fluid pressure in said flow passage.

7. The valve apparatus as set forth in claim 6, wherein:

said seat sleeve means forming an other seal with said tubular flow closure means when said tubular flow closure means is reciprocated to the closed position, said other seal formed when said tubular flow closure means in the closed position and is longitudinally spaced from said first continuous seal between said seat sleeve means and said tubular flow closure means;

said seat sleeve means having a plurality of radial flow openings formed therethrough between said first continuous seal and said other sealing location formed when said tubular flow closure means is in the closed position for enabling flow through said flow opening when said tubular flow closure means is moved from the closed position to enable flow through the valve apparatus.

8. The valve apparatus as set forth in claim 7, wherein:

said plurality of flow openings disposed in opposed radial relationship to enable inwardly flow into said seat sleeve means through said flow opening to impinge upon like flow to avoid flow erosion or flow cutting of said sealing areas of said seat sleeve means.

9. The valve apparatus as set forth in claim 8, wherein:

said tubular flow closure member forming an annular shoulder engageable with said seat sleeve means when said tubular flow closure means moves to the closed position; and said other seal with said seat formed by a resilient ring radially expanded into sealing engagement with said inner surface of said tubular flow closure means as said annular shoulder engages said seat sleeve means when said tubular flow closure member is moved to the closed position.

* * * * *